(12) United States Patent
Coteus et al.

(10) Patent No.: US 9,189,327 B2
(45) Date of Patent: Nov. 17, 2015

(54) ERROR-CORRECTING CODE DISTRIBUTION FOR MEMORY SYSTEMS

(71) Applicant: International Business Machines Corporation, Armonk, NY (US)

(72) Inventors: Paul W. Coteus, Yorktown, NY (US); Hillery C. Hunter, Chappaqua, NY (US); Charles A. Kilmer, Essex Junction, VT (US); Kyu-hyoun Kim, Mount Kisco, NY (US); Warren E. Maule, Cedar Park, TX (US); Kenneth L. Wright, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 14/084,043

(22) Filed: Nov. 19, 2013

(65) Prior Publication Data

US 2015/0143201 A1    May 21, 2015

(51) Int. Cl.
*G11C 29/00* (2006.01)
*G06F 11/10* (2006.01)

(52) U.S. Cl.
CPC .................................. *G06F 11/1008* (2013.01)

(58) Field of Classification Search
CPC ..... G06F 3/0613; G06F 3/0616; G06F 3/064; G06F 3/0658; G06F 3/0664; G06F 3/0688; G06F 12/0246; G06F 2212/7201; G06F 2212/7208; G06F 2212/7211; G06F 11/1044; G06F 11/1016; G06F 12/14; G06F 11/1076; G06F 11/2094; G11C 13/0004
See application file for complete search history.

(56) References Cited

U.S. PATENT DOCUMENTS

| 6,256,762 | B1 | 7/2001 | Beppu |
| 6,473,880 | B1 | 10/2002 | Cypher |
| 2011/0066883 | A1 | 3/2011 | Dachiku |
| 2013/0124943 | A1 | 5/2013 | Mateescu et al. |

*Primary Examiner* — Guerrier Merant
(74) *Attorney, Agent, or Firm* — Cantor Colburn LLP

(57) ABSTRACT

According to one embodiment, a memory system includes a plurality of memory devices and a memory controller operatively coupled to the memory devices. The memory controller is configured to partition write data into a plurality of data blocks, where each data block is associated with one of the memory devices. The memory controller is further configured to generate an instance of a local error-correcting code (ECC) corresponding to each data block, and merge each data block with the corresponding instance of the local ECC to form an encoded data block for each memory device. Additionally, the memory controller is configured to write each encoded data block to the memory devices such that each memory device stores one of the data blocks with the corresponding instance of the local ECC. A global ECC and a local ECC of the global ECC can also be included in the memory system.

18 Claims, 10 Drawing Sheets

ERROR-CORRECTING CODE DISTRIBUTION FOR MEMORY SYSTEMS

BACKGROUND

The present disclosure relates generally to computer memory and more particularly to error-correcting code distribution in a memory system.

Computer systems often require a considerable amount of high speed random access memory (RAM) to hold information, such as data and programs, temporarily when powered and operational. This information is normally binary, composed of patterns of 1's and 0's known as bits of data. The bits of data are often grouped and organized at a higher level. A byte, for example, is typically composed of eight bits; more generally these groups or bytes are called symbols and may be made up of any number of bits or sub-symbols.

Memory device densities have continued to grow as computer systems have become more powerful. In some cases, the RAM content of a single computer can be composed of hundreds of trillions of bits. Unfortunately, the failure of just a portion of a single RAM device can cause system-wide issues. When memory errors occur, which may be "hard" (repeating) or "soft" (one-time or intermittent) failures, these failures may occur as single cell, multi-bit, full chip or full memory module failures and all or part of the system RAM may be unusable until it is repaired. Repair turn-around-times can be hours or even days, which can have a substantial impact to a business dependent on the computer systems. In systems with an array of memory modules (servers, for example), failed memory modules may be isolated temporarily without taking the system down, in order to sustain the system operation. However, this would result in memory loss from the overall system memory and would adversely impact performance.

The probability of encountering a RAM failure during normal operation has continued to increase as the amount of memory storage in contemporary computers continues to grow. Error-correcting codes (ECCs) are used in more robust systems and are typically collectively stored in an additional device to detect and correct specific error conditions. Memory system architectures typically require a choice of ECC implementation to either correct many error bits in one or two memory devices, or error correction of one or two bits can be provided across many memory devices.

SUMMARY

According to one embodiment, a memory system includes a plurality of memory devices and a memory controller operatively coupled to the memory devices. The memory controller is configured to partition write data into a plurality of data blocks, where each of the data blocks is associated with one of the memory devices. The memory controller is further configured to generate an instance of a local error-correcting code (ECC) corresponding to each of the data blocks, and merge each of the data blocks with the corresponding instance of the local ECC to form an encoded data block for each of the memory devices. Additionally, the memory controller is configured to write each of the encoded data blocks to the memory devices such that each of the memory devices stores one of the data blocks with the corresponding instance of the local ECC. A global ECC and a local ECC of the global ECC can also be included in the memory system.

According to another embodiment, a method includes partitioning write data into a plurality of data blocks, where each of the data blocks is associated with one of a plurality of memory devices. An instance of a local ECC corresponding to each of the data blocks is generated. Each of the data blocks is merged with the corresponding instance of the local ECC to form an encoded data block for each of the memory devices. Each of the encoded data blocks is written to the memory devices such that each of the memory devices stores one of the data blocks with the corresponding instance of the local ECC. A global ECC and a local ECC of the global ECC can also be included.

According to a further embodiment, a computer program product includes a tangible storage medium readable by a processing circuit and storing instructions for execution by the processing circuit for performing a method. The method includes partitioning write data into a plurality of data blocks, where each of the data blocks is associated with one of a plurality of memory devices. An instance of a local ECC corresponding to each of the data blocks is generated. Each of the data blocks is merged with the corresponding instance of the local ECC to form an encoded data block for each of the memory devices. Each of the encoded data blocks is written to the memory devices such that each of the memory devices stores one of the data blocks with the corresponding instance of the local ECC. A global ECC and a local ECC of the global ECC can also be included.

DETAILED DESCRIPTION

In an embodiment, each memory device (e.g., dynamic random-access memory or DRAM) in a group of memory devices on a memory bus includes a local error-correcting code (ECC) calculated on a data block and memory device basis. As one example, nine memory devices each have a device data bus width of 8 bits and support a burst length of eight. Accordingly, each burst write to the memory devices includes up to 513 bits of data and 63 bits of local ECC, which can be distributed as 57 bits of data and 7 bits of local ECC per memory device. Distributing the local ECC bits to each memory device can support a number of faults, e.g., one or two bit flips, in each memory device. Additional failure mode coverage may be achieved by adding a global ECC storage memory device to store a global ECC calculated across all of the memory devices in addition to the local ECC values for each device. The global ECC can correct for an entire memory device failure or a single/double bit failure in a single memory device. The global ECC storage memory device can itself have a local ECC value to protect global ECC data. Local ECC and global ECC values can be used in combination to correct a number of error modes that may otherwise be uncorrectable.

Figure 1:
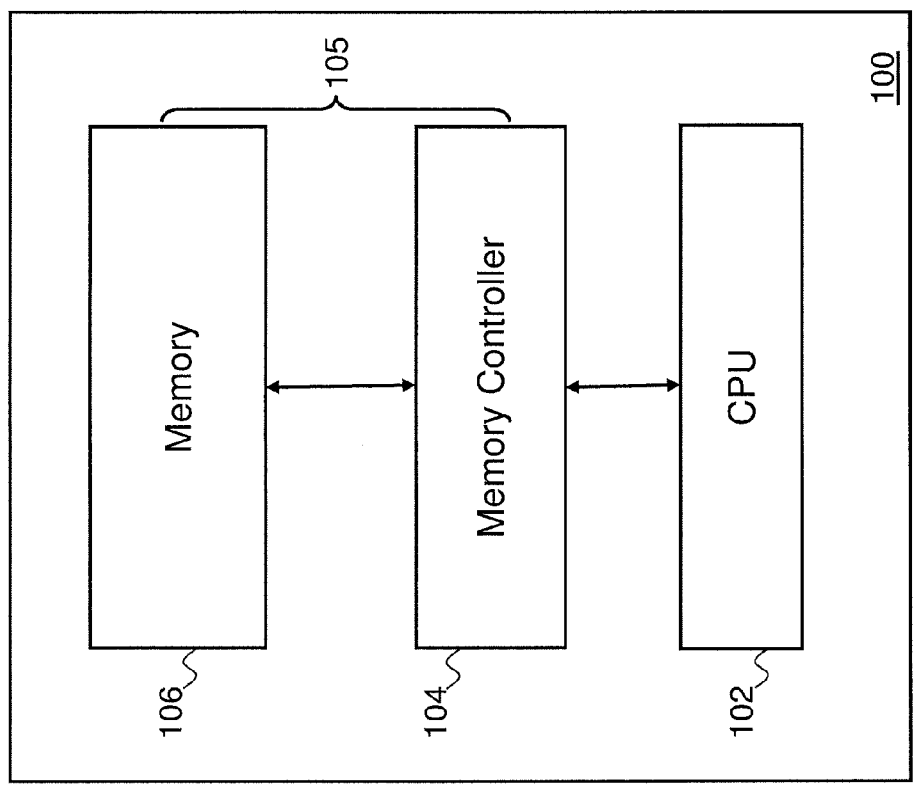
FIG. 1 illustrates a block diagram of a processing system including a memory system in accordance with an embodiment.

FIG. 1 illustrates a block diagram of a processing system 100 for storing and retrieving data in a memory in accordance with an embodiment. The processing system 100 depicted in FIG. 1 includes a computer processor 102, a memory 106 including memory devices, and a memory controller 104 for receiving data from the computer processor 102 to be stored in the memory 106. Collectively, the memory controller 104 and the memory 106 are referred to as a memory system 105. In addition, the memory 106 may also include one or more global ECC storage memory devices.

In one embodiment, the memory controller 104 is coupled to the computer processor 102 and receives write requests and read requests from the computer processor 102. Upon receiving a write request, the memory controller 104 generates any needed ECC values to support the ECC architecture of the memory system 105, such as local ECC values or both local and global ECC values for memory 106. The memory controller 104 writes data and ECC values to the memory 106 as further described herein. Similarly, the memory controller 104 uses ECC values, such as local ECC values or both local and global ECC values, retrieved on read operations to detect and correct errors in data read from the memory 106 as further described herein.

The processing system 100 is one example of a configuration that may be utilized to perform the processing described herein. Although the processing system 100 has been depicted with only one computer processor 102 and memory controller 104, it will be understood that other embodiments would also operate in other systems with two or more of the computer processor 102 or memory controller 104. The computer processor 102 may also be referred to as a processing circuit or processing circuitry, and can include multiple processing cores or be distributed over multiple devices. The memory 106 can represent any number of memory devices including multiple groups of memory devices organized as ranks, modules, stacks, or planar configurations. In an embodiment, the memory 106, memory controller 104, and computer processor 102 are not located within the same computer. For example, the memory 106 and memory controller 104 may be located in one physical location (e.g., on a memory module) while the computer processor 102 is located in another physical location (e.g., the computer processor 102 accesses the memory controller 104 via a network). In addition, portions of the processing described herein may span one or more of the memory 106, memory controller 104, and computer processor 102.

Figure 2:
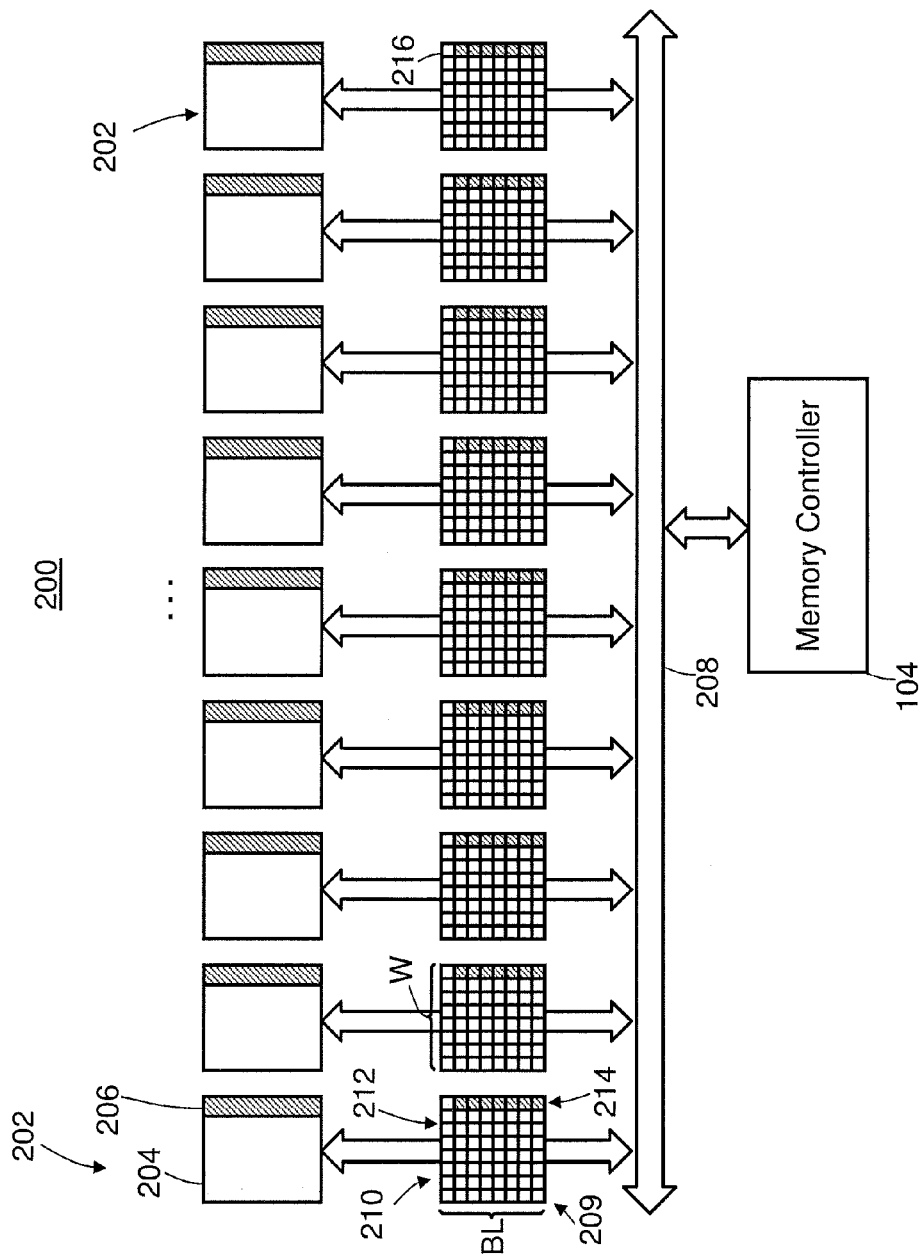
FIG. 2 illustrates a block diagram of an embodiment of the memory system of FIG. 1.

FIG. 2 illustrates a block diagram of an embodiment of the memory system 105 of FIG. 1 as memory system 200. The memory system 200 includes the memory controller 104 of FIG. 1 and a plurality of memory devices 202 as an embodiment of the memory 106 of FIG. 1. Each of the memory devices 202 can store both data values 204 and ECC values 206. Although FIG. 2 depicts the ECC values 206 as a column or stripe in each of the memory devices 202 for purposes of illustration, the ECC values 206 can be distributed in any pattern within each of the memory devices 202. The ECC values 206 are generated on a data block basis for each of the memory devices 202. The memory controller 104 is operatively coupled to the memory devices 202 via a memory bus 208. For instance, each of the memory devices 202 may have an input/output (I/O) width (W) of 8-bits and support a burst length (BL) of eight, such that a single read or write operation across nine memory devices 202 results in eight 72-bit transfers (576 total bits) as a burst 209 on the memory bus 208 between the memory controller 104 and the memory devices 202.

On each write operation, the memory devices 202 each receive an encoded data block 210 that includes a data block 212 and a local ECC 214 corresponding to the data block 212. Similarly, on each read operation, the memory devices 202 each return an encoded data block 210 that includes a data block 212 and a local ECC 214. The local ECC 214 is generated for each corresponding data block 212 forming the encoded data block 210 to correct bit errors for each of the memory devices 202. The term "encoded" in the encoded data block 210 refers to an arrangement where a data block is merged with a corresponding instance of local ECC to form a larger block structure. Collectively, the local ECCs 214 distributed across the memory devices 202 can correct one or two bit errors in each of the data blocks 212 per read operation.

In the example of FIG. 2, each encoded data block 210 includes 57 bits in the data block 212 and 7 bits in the local ECC 214 forming a (57,7) single error correction-double error detection (SEC DED) code. In this example, each of the data blocks 212 includes an odd number of bits, and each instance of the local ECC also includes an odd number of bits such that a total number of bits in the encoded data block 210 is even (e.g., 64 bits total). If write data provided by the computer processor 102 of FIG. 1 includes, for instance, 64 bytes of user data (512 bits of data), then one bit can be added as a special purpose bit 216 in addition to the 64 bytes of user data to form write data that is partitioned into nine data blocks 212 associated with the nine memory devices 202 of FIG. 2. The special purpose bit 216 can be included in any predetermined location across the encoded data blocks 210 in the burst 209. The special purpose bit 216 may be interpretable by the memory controller 104 while appearing as an arbitrary data bit in one of the data blocks 212. The special purpose bit 216 can add another level of variation to protect data values 204. As non-limiting examples, the special purpose bit 216 can be a parity bit or an inversion bit. A parity bit may be determined by applying an exclusive- or operation across all write data bits before partitioning into the data blocks 212. An inversion bit may be used to invert stored values in the data values 204 to detect stuck bits or reduce device wear-out of physical cell locations in the memory devices 202.

Figure 3:
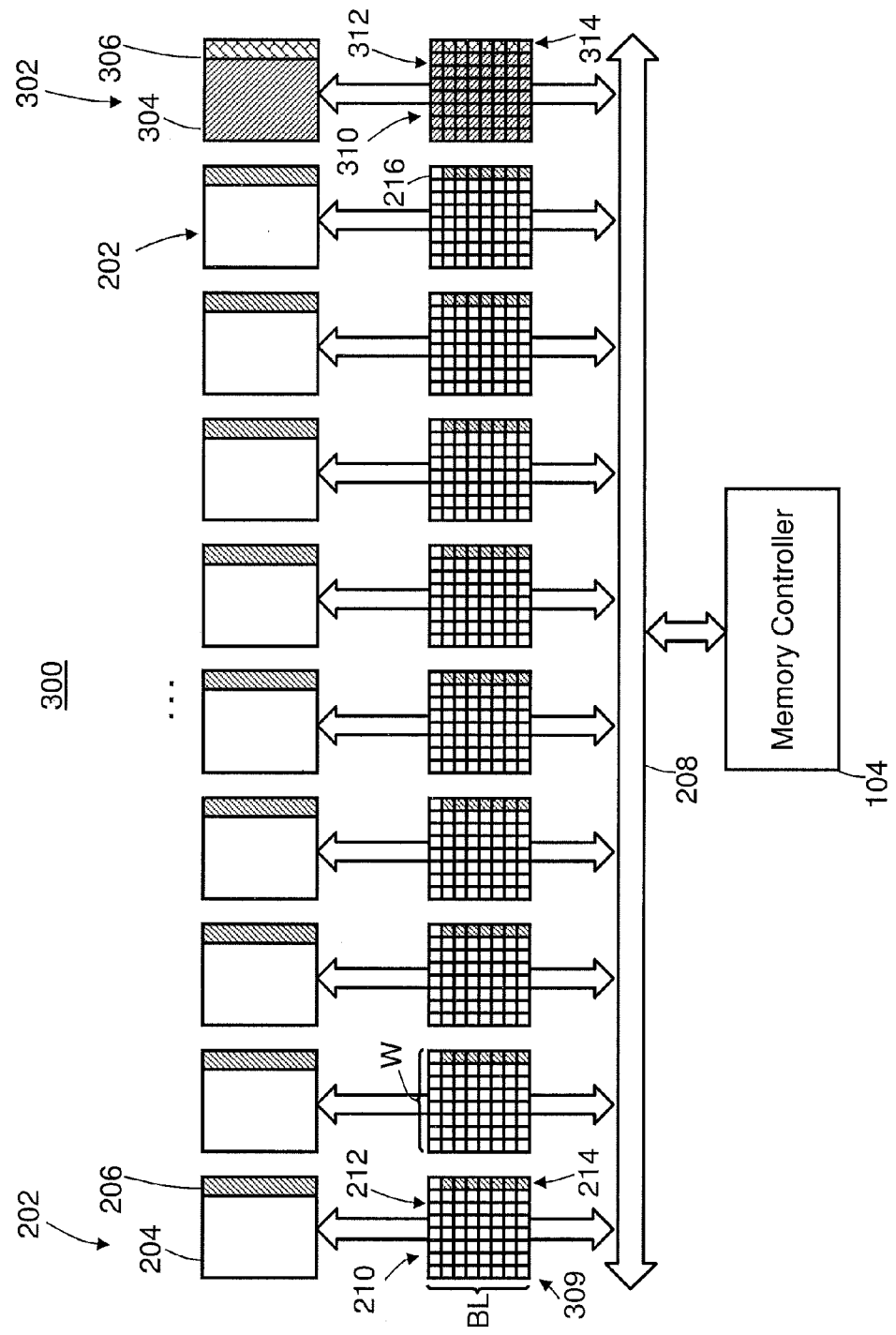
FIG. 3 illustrates a block diagram of another embodiment of the memory system of FIG. 1.

FIG. 3 illustrates a block diagram of another embodiment of the memory system 105 of FIG. 1 as memory system 300. Similar to the memory system 200 of FIG. 2, the memory system 300 of FIG. 3 includes the memory controller 104 of FIG. 1 and a plurality of memory devices 202 as an embodiment of the memory 106 of FIG. 1. Each of the memory devices 202 can store both data values 204 and ECC values 206. As in FIG. 2, the memory system 300 includes nine memory devices 202; however, the memory system 300 also includes a global ECC storage memory device 302 operably coupled to the memory controller 104 via memory bus 208. Both the memory devices 202 and the global ECC storage memory device 302 may have a same physical structure but vary in the type and usage of data/check values stored in each device 202 and 302.

The global ECC storage memory device 302 can store both global ECC values 304 and local ECC values 306 associated with the global ECC values 304. The global ECC values 304 provide ECC coverage across the memory devices 202 and the local ECC values 306 provide ECC coverage for the global ECC values 304, similar to the ECC values 206 with respect to the data values 204. The global ECC values 304 may be based on only the data values 204 in the memory devices 202 or a combination of the data values 204 and the ECC values 206 in the memory devices 202.

Reading from or writing to the memory devices 202 and the global ECC storage memory device 302 can be collectively performed as a burst 309. In the example of FIG. 3, the burst 309 includes nine encoded data blocks 210, with one encoded data block 210 per memory device 202, and one encoded global ECC block 310. Each of the encoded data blocks 210 includes a data block 212 and local ECC 214. The encoded global ECC block 310 includes a global ECC block 312 and a local ECC 314. Similar to the example of FIG. 2, a special purpose bit 216 can be included in any predetermined location across the encoded data blocks 210 in the burst 309. In the example of FIG. 3, each data block 212 includes 57 bits and each local ECC 214 is 7 bits. Similarly, the global ECC block 312 can include 57 bits, and the local ECC 314 can include 7 bits.

Figure 4:
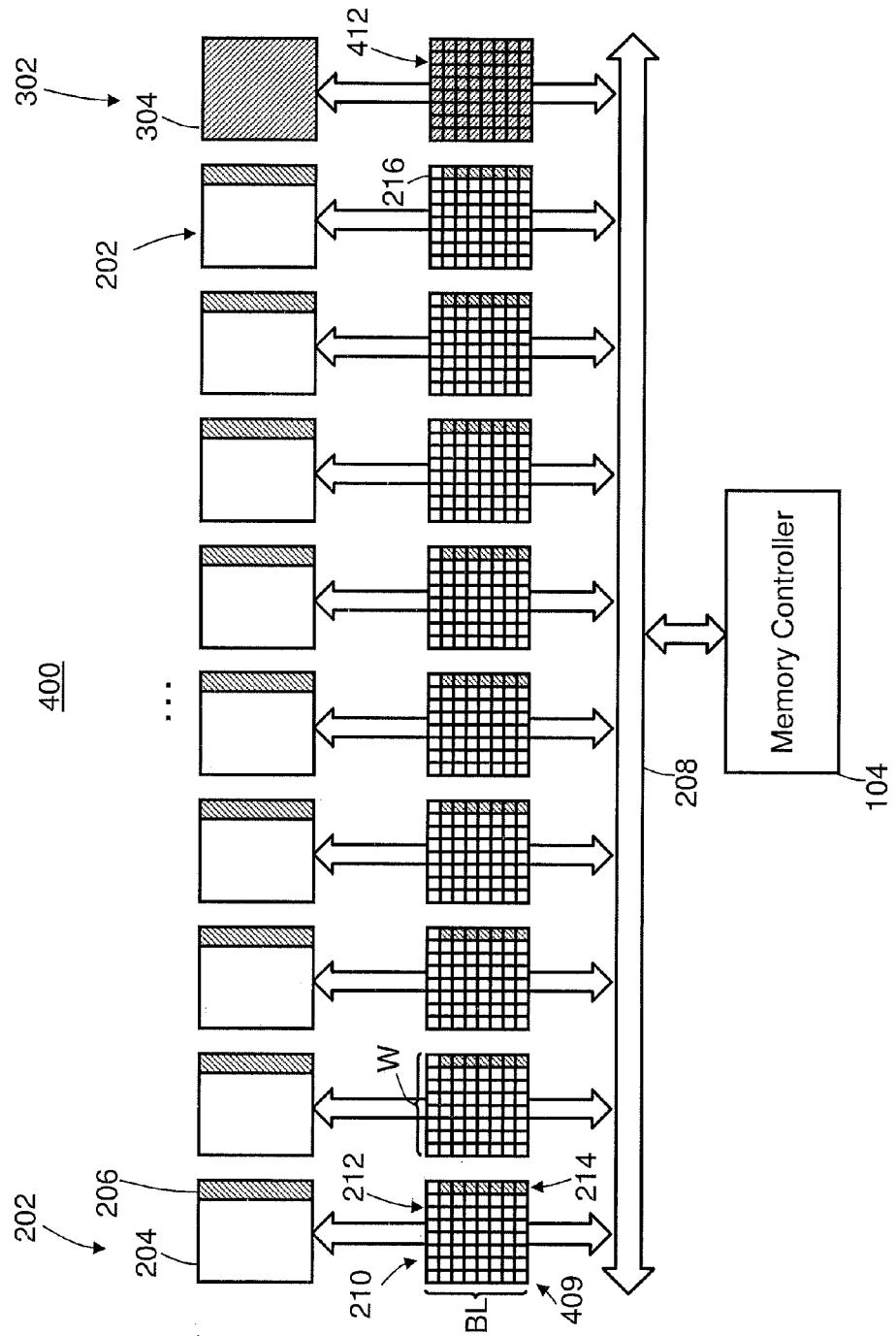
FIG. 4 illustrates a block diagram of another embodiment of the memory system of FIG. 1.

FIG. 4 illustrates a block diagram of another embodiment of the memory system 105 of FIG. 1 as memory system 400. Similar to the memory system 300 of FIG. 3, the memory system 400 of FIG. 4 includes the memory controller 104 of FIG. 1, memory devices 202 and a global ECC storage memory device 302 operably coupled to the memory controller 104 via memory bus 208. In the memory system 400, the global ECC storage memory device 302 stores global ECC values 304 but does not store local ECC values, such as local ECC values 306 of FIG. 3. The global ECC values 304 provide ECC coverage across the memory devices 202. By omitting the local ECC values 306 of FIG. 3, a greater number of bits are available for the global ECC values 304 in the global ECC storage memory device 302 of FIG. 4.

Reading from or writing to the memory devices 202 and the global ECC storage memory device 302 can be collectively performed as a burst 409 in the memory system 400. In the example of FIG. 4, the burst 409 includes nine encoded data blocks 210, with one encoded data block 210 per memory device 202, and one global ECC block 412. Each of the encoded data blocks 210 includes a data block 212 and local ECC 214. In FIG. 4 there is no encoded global ECC block or local ECC for a global ECC block. Bits used for the local ECC 314 of FIG. 3 are added to the global ECC block 412 of FIG. 4. Accordingly, the global ECC block 412 can be greater in size than the global ECC block 312 of FIG. 3, and the global ECC block 412 includes a greater number of bits than a number of bits included in any one of the data blocks 212. For example, the global ECC block 312 of FIG. 3 may include 57 bits, while the global ECC block 412 of FIG. 4 includes 64 bits. Additional bits in the global ECC block 412 (e.g., 64 bits) can be used to provide coverage of the encoded data blocks 210 (e.g., 64 bits each), while the global ECC block 312 (e.g., 57 bits) of FIG. 3 may be calculated across all of the data blocks 212 (e.g., 57 bits each) of FIG. 3 or across all of the encoded data blocks 210 (e.g., 64 bits each) of FIG. 3. In an alternate embodiment, the global ECC block 412 is calculated across all of the data blocks 212.

Figure 5:
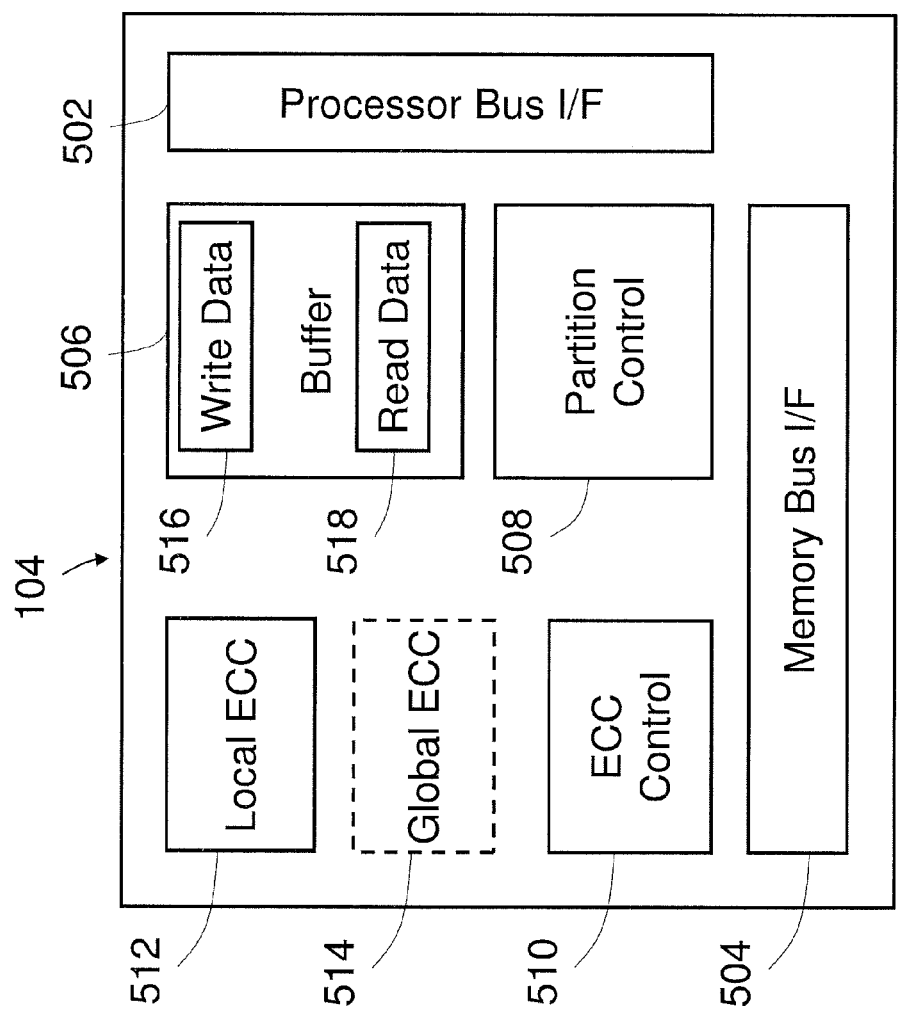
FIG. 5 illustrates a block diagram of a memory controller in accordance with an embodiment.

FIG. 5 illustrates a block diagram of the memory controller 104 of FIG. 1 in accordance with exemplary embodiments. In the example of FIG. 5, the memory controller 104 includes a processor bus interface 502 operably coupled the computer processor 102 of FIG. 1. The memory controller 104 also includes a memory bus interface 504 operably coupled to the memory bus 208 of FIGS. 2-4. The memory controller 104 may also include a buffer 506 and a partition control 508. The buffer 506 is configured to receive write data 516 from the processor bus interface 502 to be written to the memory 106 of FIG. 1 or receive read data 518 from the memory 106 of FIG. 1 for the computer processor 102 of FIG. 1. Write data 516 and read data 518 can have separately defined locations in the buffer 506, or common locations within the buffer 506 can be used for either write data 516 or read data 518. The partition control 508 is operable to partition write data 516 from the buffer 506 into a plurality of data blocks, such as data blocks 212 of FIGS. 2-4. The partition control 508 may also combine received data blocks into the buffer 506 when read data 518 are received from the memory 106 of FIG. 1.

An ECC control 510 manages sequencing of partitioning, ECC generation, block coding/decoding, error correction, and retry logic. The memory controller 104 includes local ECC logic 512 and may include global ECC logic 514 in some embodiments. Operation of the memory controller 104 is further described in reference to FIGS. 6-10.

Figure 6:
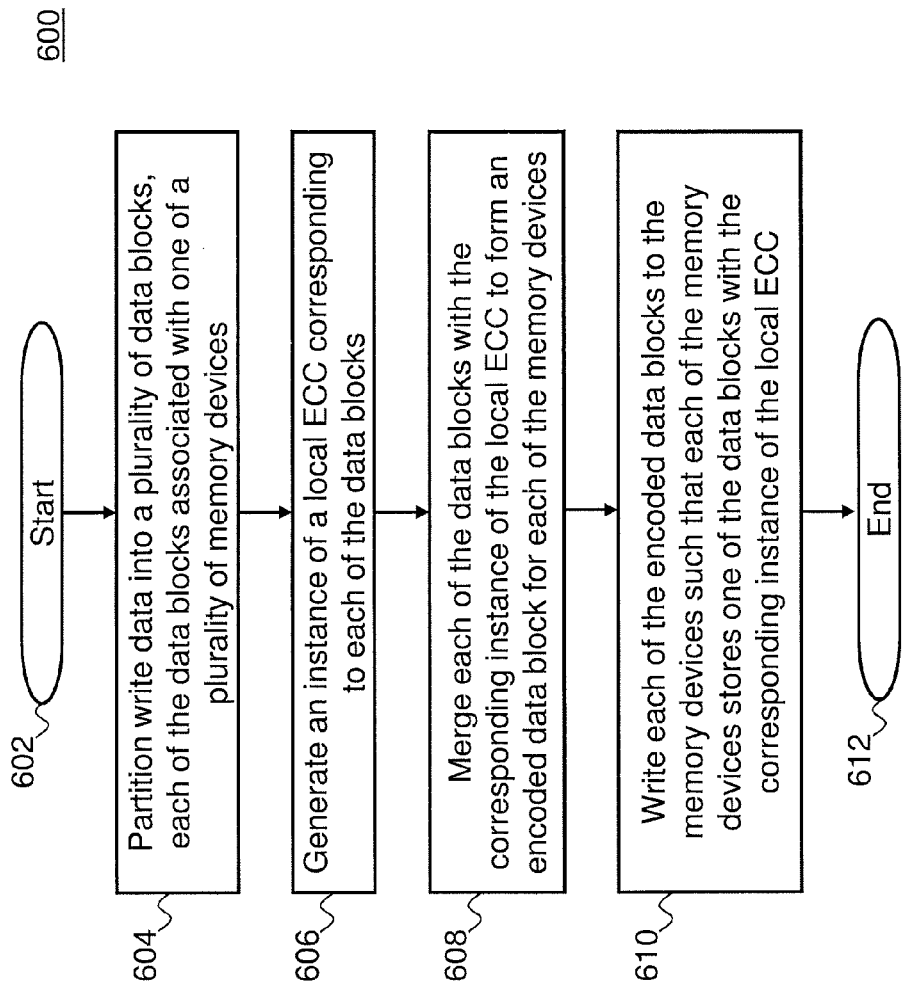
FIG. 6 is a flow chart of an encoding process in accordance with an embodiment.

FIG. 6 is a flow chart of an encoding process 600 depicted in accordance with an embodiment. The process 600 as depicted in FIG. 6 is a high-level example of a process for encoding data blocks with a local ECC to be written to each memory device 202 of FIGS. 2-4. For purposes of explanation, the process 600 is described in reference to FIGS. 1, 2, 5 and 6 but may be applicable to the memory systems 300 and 400 of FIGS. 3 and 4.

At block 602, the process 600 begins. The memory controller 104 may receive a block of write data 516 in the buffer 506 from the computer processor 102 to be written to memory 106. At block 604, the partition control 508 partitions the write data 516 into a plurality of data blocks 212, where each of the data blocks 212 is associated with one of a plurality of memory devices 202. A special purpose bit 216 may be added to one of the data blocks 212. At block 606, local ECC logic 512 generates an instance of a local ECC 214 corresponding to each of the data blocks 212. At block 608, the ECC control 510 merges each of the data blocks 212 with the corresponding instance of the local ECC 214 to form an encoded data block 210 for each of the memory devices 202. At block 610, each of the encoded data blocks 210 is written to the memory devices 202 such that each of the memory devices 202 stores one of the data blocks 212 with the corresponding instance of the local ECC 214 as data values 204 and ECC values 206. At block 612, the process 600 ends.

Figure 7:
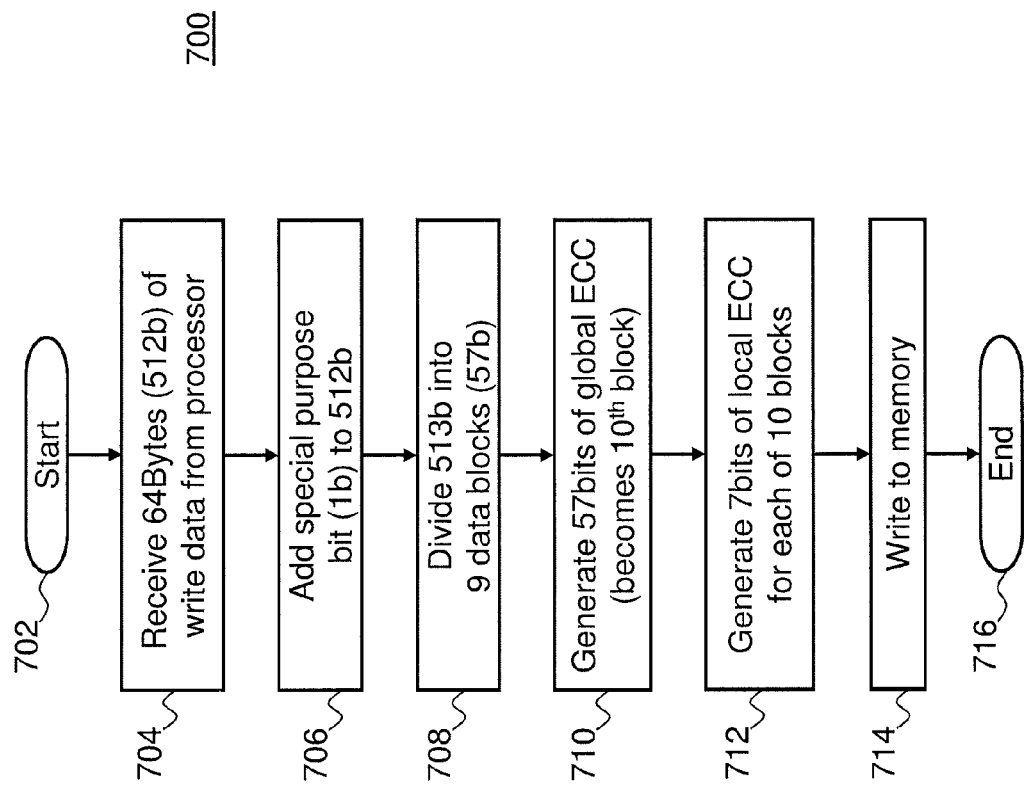
FIG. 7 is a flow chart of another encoding process in accordance with an embodiment.

FIG. 7 is a flow chart of another encoding process 700 in accordance with an embodiment. The process 700 is an example of an encoding process that may be performed on the memory system 300 of FIG. 3. The process 700 is described in reference to FIGS. 1, 3, 5, and 7. At block 702, the process 700 begins. At block 704, the memory controller 104 receives write data 516 in buffer 506 from the computer processor 102. In this example, the write data 518 includes 64 bytes (512 bits). At block 706, the ECC control 510 adds a special purpose bit 216 to the 512 bits of write data 516, resulting in 513 bits. As previously described, the special purpose bit 216 can be, for instance, a parity bit or an inversion bit. At block 708, the partition control 508 divides the 513 bits into nine data blocks 212. The special purpose bit 216 is included in one of the data blocks 212 prior to generation of the local ECC 214, such that the special purpose bit 216 is covered by a local and/or global ECC.

At block 710, the global ECC logic 514 generates 57 bits of global ECC as the global ECC block 312. At block 712, the local ECC logic 512 generates 7 bits of local ECC for each block 212, 312, including nine instances of local ECC 214 and one instance of local ECC 314. The ECC control 510 merges each of the data blocks 212 with the corresponding instance of the local ECC 214 to form an encoded data block 210 for each of the memory devices 202. The ECC control 510 also merges the global ECC block 312 with the local ECC 314 to form an encoded global ECC block 310. At block 714, the ECC control 510 initiates a write of burst 309 including nine encoded data blocks 210 to memory devices 202 and one encoded global ECC block 310 to the global ECC storage memory device 302. At block 716, the process 700 ends.

Figure 8:
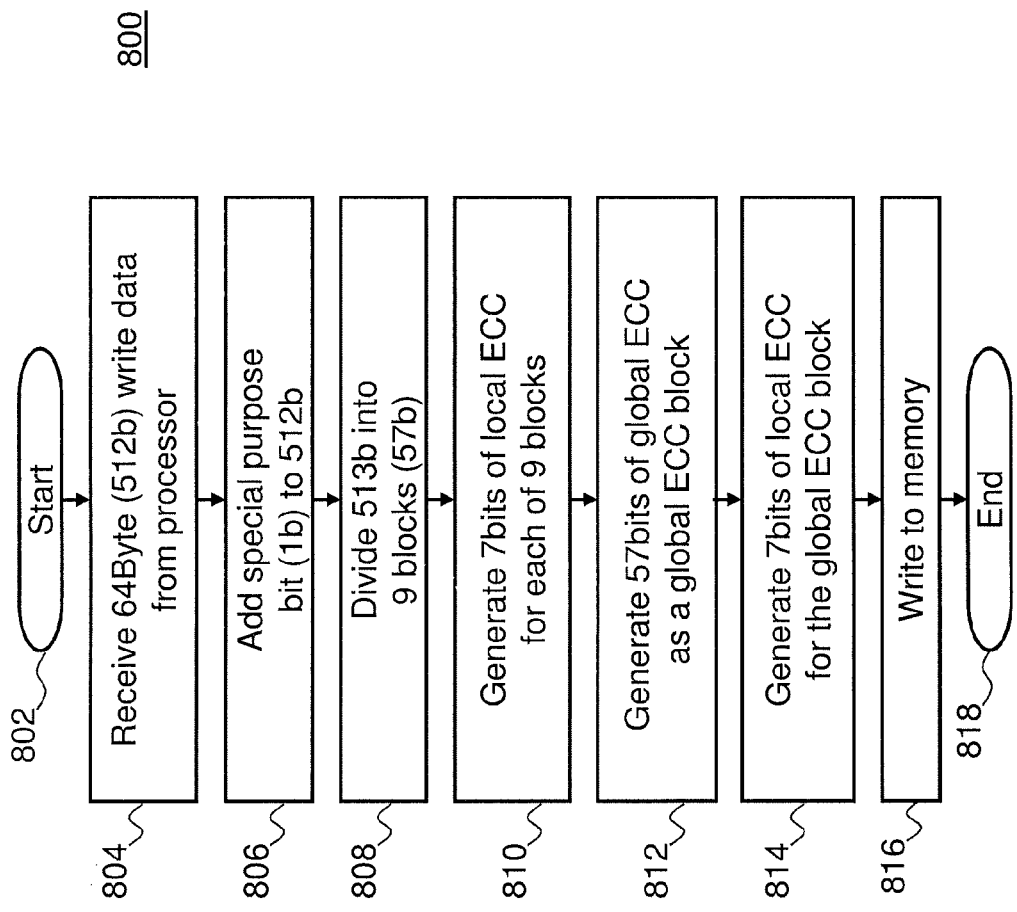
FIG. 8 is a flow chart of an additional encoding process in accordance with an embodiment.

FIG. 8 is a flow chart of an additional encoding process 800 in accordance with an embodiment. The process 800 is another example of an encoding process that may be performed on the memory system 300 of FIG. 3. The process 800 is described in reference to FIGS. 1, 3, 5, and 8. At block 802, the process 800 begins. At block 804, the memory controller 104 receives write data 516 in buffer 506 from the computer processor 102. In this example, the write data 518 includes 64 bytes (512 bits). At block 806, the ECC control 510 adds a special purpose bit 216 to the 512 bits of write data 516, resulting in 513 bits. As previously described, the special purpose bit 216 can be, for instance, a parity bit or an inversion bit. At block 808, the partition control 508 divides the 513 bits into nine data blocks 212. The special purpose bit 216 is included in one of the data blocks 212 prior to generation of the local ECC 214, such that the special purpose bit 216 is covered by a local and/or global ECC.

At block 810, the local ECC logic 512 generates 7 bits of local ECC as the local ECC 214 corresponding to each of the nine data blocks 212. The ECC control 510 merges each of the data blocks 212 with the corresponding instance of the local ECC 214 to form an encoded data block 210 for each of the memory devices 202. At block 812, the global ECC logic 514 generates 57 bits of global ECC as a global ECC block 312 across all of the data blocks 212 or the encoded data blocks 210. At block 814, the local ECC logic 512 generates 7 bits of local ECC 314 for the global ECC block 312. The ECC control 510 also merges the global ECC block 312 with the local ECC 314 to form an encoded global ECC block 310. At block 816, the ECC control 510 initiates a write of burst 309 including nine encoded data blocks 210 to memory devices 202 and one encoded global ECC block 310 to the global ECC storage memory device 302. At block 818, the process 800 ends.

In comparison, the process 700 of FIG. 7 is an example of calculating the global ECC block 312 on the data blocks 212 without regard to the local ECC 214 of each encoded data block 210. The process 800 of FIG. 8 can calculate the global ECC block 312 on the encoded data blocks 210 including the data blocks 212 and the local ECCs 214; however, this results in a longer process as the local ECC 314 cannot be generated until the global ECC block 312 is generated, and the global ECC block 312 is generated after the local ECCs 214 are generated.

Figure 9:
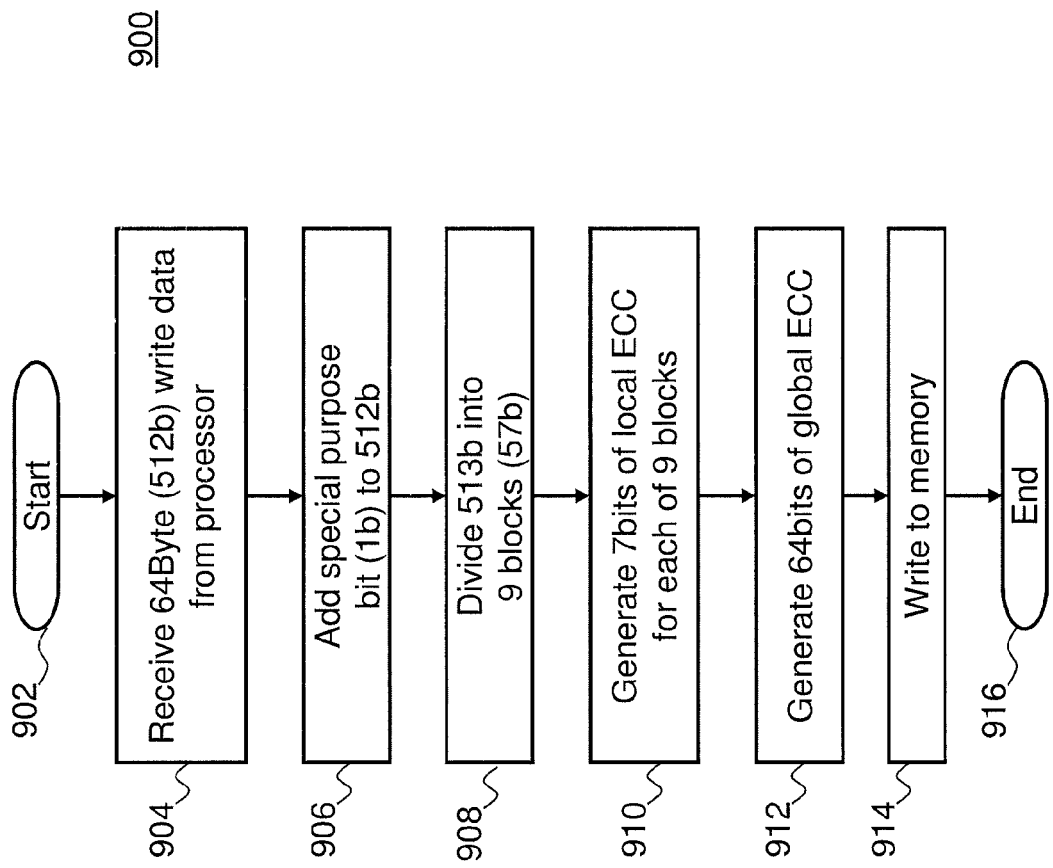
FIG. 9 is a flow chart of a further encoding process in accordance with an embodiment.

FIG. 9 is a flow chart of a further encoding process 900 in accordance with an embodiment. The process 900 is an example of an encoding process that may be performed on the memory system 400 of FIG. 4. The process 900 is described in reference to FIGS. 1, 4, 5, and 9. At block 902, the process 900 begins. At block 904, the memory controller 104 receives write data 516 in buffer 506 from the computer processor 102. In this example, the write data 516 includes 64 bytes (512 bits). At block 906, the ECC control 510 adds a special purpose bit 216 to the 512 bits of write data 516, resulting in 513 bits. As previously described, the special purpose bit 216 can be, for instance, a parity bit or an inversion bit. At block 908, the partition control 508 divides the 513 bits into nine data blocks 212. The special purpose bit 216 is included in one of the data blocks 212 prior to generation of the local ECC 214, such that the special purpose bit 216 is covered by a local and/or global ECC.

At block 910, the local ECC logic 512 generates 7 bits of local ECC as the local ECC 214 corresponding to each of the nine data blocks 212. The ECC control 510 merges each of the data blocks 212 with the corresponding instance of the local ECC 214 to form an encoded data block 210 for each of the memory devices 202. At block 912, the global ECC logic 514 generates 64 bits of global ECC as a global ECC block 312 across all of the data blocks 212 or the encoded data blocks 210. At block 914, the ECC control 510 initiates a write of burst 409 including nine encoded data blocks 210 to memory devices 202 and one global ECC block 412 to the global ECC storage memory device 302. At block 916, the process 900 ends.

The process 900 of FIG. 9 is similar to the process 800 of FIG. 8 with the exception that no local ECC is generated for the global ECC block 412. This provides additional bits for the global ECC block 412 as compared to the global ECC block 312 of FIG. 3 and a faster process; however, the ability to correct errors within the global ECC block 412 is removed.

Figure 10:
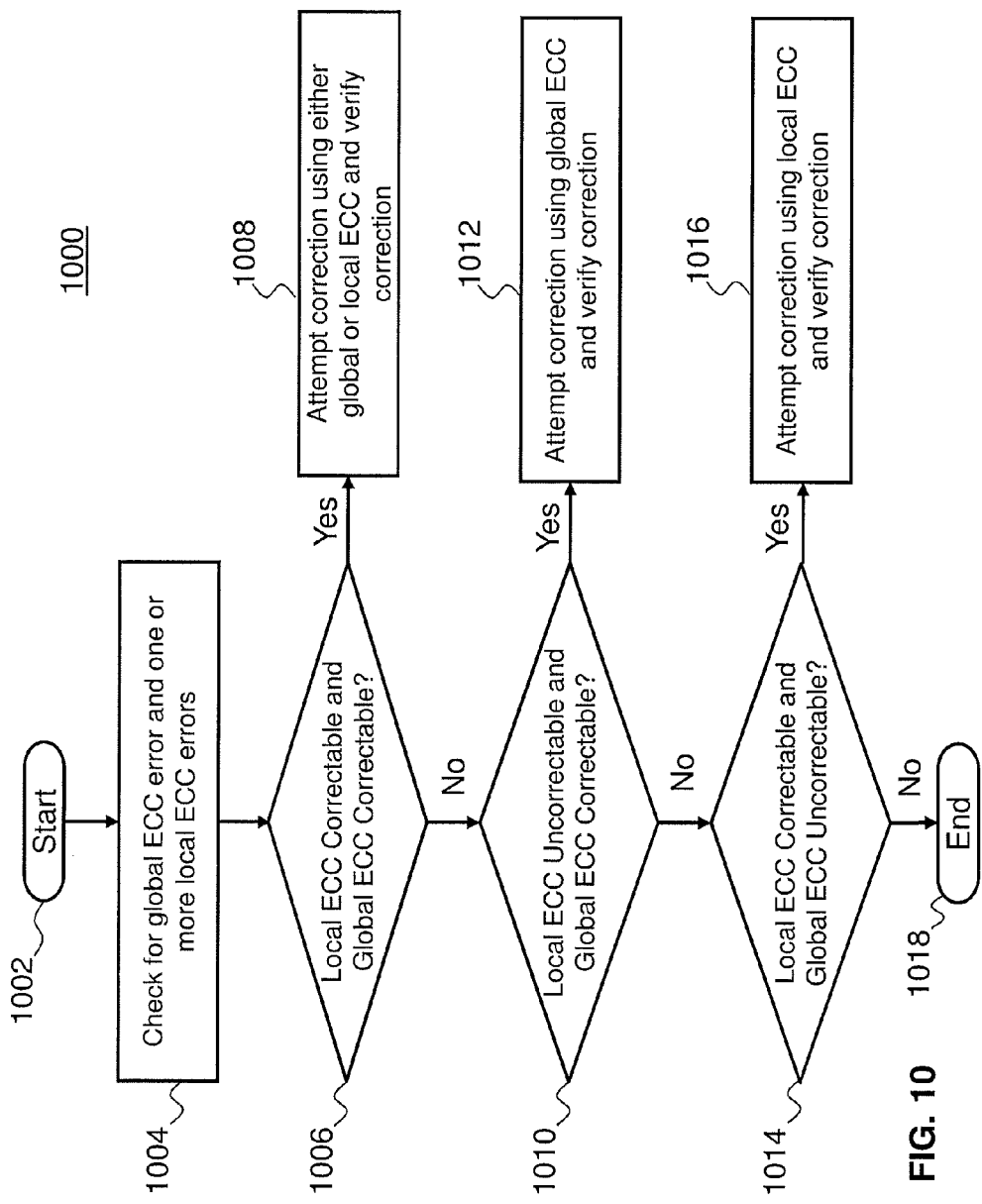
FIG. 10 is a flow chart of an error correction process in accordance with an embodiment.

FIG. 10 is a flow chart of an error correction process 1000 in accordance with an embodiment. For purposes of explanation, the process 1000 is described in reference FIGS. 1, 3, 5, and 10 but may also be applicable to the memory system 400 of FIG. 4. The sequence of checks described in FIG. 10 need not be performed linearly and may be performed in any order or combined as a single operation. At block 1002, the process 1000 begins. At block 1004, the memory controller 104 receives a burst, such as burst 309, from memory 106 in response to a read request from the computer processor 102. The ECC control 510 initiates the global ECC logic 514 and the local ECC logic 512 to check for a global ECC error and one or more local ECC errors based on reading the global ECC storage memory device 302 and the memory devices 202. Errors can be identified as correctable or uncorrectable based on an estimated number of bit errors detected relative to global or local ECC analysis. If there are more bit errors detected than a given ECC is operable to correct, then an uncorrectable error is identified. If there are a maximum supported or fewer errors detected (e.g., at least one error), then a correctable error is identified. Analysis relative to one or more local ECCs 214 associated with specific memory devices 202 can indicate that an uncorrectable error exists for the specific memory devices 202, while data blocks 212 for other memory devices 202 in the same burst 309 can have no errors or correctable errors.

At block 1006, a check is performed to determine whether a global ECC correctable error and a local ECC correctable error are identified. At block 1008, based on determining that a global ECC correctable error and a local ECC correctable error are identified, error correction is attempted using either a read global ECC or a read local ECC (i.e., the global ECC block 312 or local ECC 214, 314 read from burst 309 corresponding to a read operation), and the ECC control 510 verifies that neither the global ECC correctable error nor the local ECC correctable error exist after attempting the error correction.

At block 1010, if a global ECC correctable error and a local ECC correctable error are not identified, then a check is performed to determine whether a global ECC correctable error and a local ECC uncorrectable error are identified. At block 1012, based on determining that a global ECC correctable error and a local ECC uncorrectable error are identified, error correction is attempted using the read global ECC, and the ECC control 510 verifies that the local ECC uncorrectable error is corrected or correctable after attempting the error correction using the read global ECC.

At block 1014, if a global ECC correctable error and a local ECC uncorrectable error are not identified, then a check is performed to determine whether a global ECC uncorrectable error and a local ECC correctable error are identified. At block 1016, based on determining that a global ECC uncorrectable error and a local ECC correctable error are identified, error correction is attempted using the read local ECC, and the ECC control 510 verifies that the global ECC uncorrectable error is corrected or correctable after attempting the error correction using the read local ECC. Even if one local ECC uncorrectable and the global ECC uncorrectable errors are identified, local ECC correction may be attempted if at least one data block 212 has a correctable error, as that correction may enable other corrections to be successful. At block 1018, the process 1000 ends.

Retrying of error correction using the process 1000 may be performed based on determining that a local ECC uncorrectable error transitioned to a local ECC correctable error or a global ECC uncorrectable error transitioned to a global ECC correctable error. Multiple iterations of the process 1000 can be performed until all correctable errors are corrected or uncorrectable errors remain uncorrected.

Technical effects and benefits include distributing a local ECC across a plurality of memory devices in a memory system to enable detection and correction of bit errors in multiple memory devices in parallel. Inclusion of a global ECC in combination with local ECC can accommodate full memory device failures and further enhances error correction capabilities. Adding a local ECC to the global ECC makes error correction capabilities even more robust.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible storage medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A memory system, comprising:
a plurality of memory devices; and
a memory controller operatively coupled to the memory devices and configured to:
partition write data into a plurality of data blocks, each of the data blocks associated with one of the memory devices;
generate an instance of a local error-correcting code (ECC) corresponding to each of the data blocks;
merge each of the data blocks with the corresponding instance of the local ECC to form an encoded data block for each of the memory devices;
write each of the encoded data blocks to the memory devices such that each of the memory devices stores one of the data blocks with the corresponding instance of the local ECC;
generate a global ECC across all of the data blocks or the encoded data blocks;
write the global ECC to a global ECC storage memory device;
check for a global ECC error and one or more local ECC errors based on reading the global ECC storage memory device and the memory devices;
based on determining global ECC correctable error and a local ECC correctable error are identified, attempting error correction using either a read global ECC or a read local ECC, and verifying that neither the global ECC correctable error nor the local ECC correctable error exist after attempting the error correction;
based on determining that the global ECC correctable error and a local ECC uncorrectable error are identified, attempting error correction using the read global ECC, and verifying that the local ECC uncorrectable error is corrected or correctable after attempting the error correction using the read global ECC; and
based on determining that a global ECC uncorrectable error and the local ECC correctable error are identified, attempting error correction using the read local ECC, and verifying that the global ECC uncorrectable error is corrected or correctable after attempting the error correction using the read local ECC.

2. The memory system of claim 1, wherein the memory controller is further configured to:
generate an instance of a local ECC corresponding to the global ECC; and
write the instance of the local ECC corresponding to the global ECC to the global ECC storage memory device.

3. The memory system of claim 1, wherein the global ECC comprises a greater number of bits than a number of bits included in any one of the data blocks.

4. The memory system of claim 1, wherein the memory controller is further configured to include a special purpose bit in one of the data blocks prior to generation of the local ECC, each of the data blocks comprising an odd number of bits, and each instance of the local ECC comprising an odd number of bits.

5. The memory system of claim 4, wherein the special purpose bit comprises a parity bit or an inversion bit.

6. The memory system of claim 1, wherein the memory controller is further configured to:
retry error correction based on determining that the local ECC uncorrectable error transitioned to the local ECC correctable error or the global ECC uncorrectable error transitioned to the global ECC correctable error.

7. A method comprising:
partitioning write data into a plurality of data blocks, each of the data blocks associated with one of a plurality of memory devices;
generating an instance of a local error-correcting code (ECC) corresponding to each of the data blocks;
merging each of the data blocks with the corresponding instance of the local ECC to form an encoded data block for each of the memory devices;
writing each of the encoded data blocks to the memory devices such that each of the memory devices stores one of the data blocks with the corresponding instance of the local ECC
generating a global ECC across all of the data blocks or the encoded data blocks;
writing the global ECC to a global ECC storage memory device;
checking for a global ECC error and one or more local ECC errors based on reading the global ECC storage memory device and the memory devices;
based on determining that a global ECC correctable error and a local ECC correctable error are identified, attempting error correction using either a read global ECC or a read local ECC, and verifying that neither the global ECC correctable error nor the local ECC correctable error exist after attempting the error correction;
based on determining that the global ECC correctable error and a local ECC uncorrectable error are identified, attempting error correction using the read global ECC, and verifying that the local ECC uncorrectable error is corrected or correctable after attempting the error correction using the read global ECC; and based on determining that a global ECC uncorrectable error and the local ECC correctable error are identified, attempting error correction using the read local ECC, and verifying that the global ECC uncorrectable error is corrected or correctable after attempting the error correction using the read local ECC.

8. The method of claim 7, further comprising:
generating an instance of a local ECC corresponding to the global ECC; and
writing the instance of the local ECC corresponding to the global ECC to the global ECC storage memory device.

9. The method of claim 7, wherein the global ECC comprises a greater number of bits than a number of bits included in any one of the data blocks.

10. The method of claim 7, further comprising:
inserting a special purpose bit in one of the data blocks prior to generation of the local ECC, each of the data blocks comprising an odd number of bits, and each instance of the local ECC comprising an odd number of bits.

11. The method of claim 10, wherein the special purpose bit comprises a parity bit or an inversion bit.

12. The method of claim 7, further comprising:
retrying error correction based on determining that the local ECC uncorrectable error transitioned to the local ECC correctable error or the global ECC uncorrectable error transitioned to the global ECC correctable error.

13. A computer program product comprising:
a tangible storage medium readable by a processing circuit and storing instructions for execution by the processing circuit for performing a method comprising:
partitioning write data into a plurality of data blocks, each of the data blocks associated with one of a plurality of memory devices;
generating an instance of a local error-correcting code (ECC) corresponding to each of the data blocks;
merging each of the data blocks with the corresponding instance of the local ECC to form an encoded data block for each of the memory devices;
writing each of the encoded data blocks to the memory devices such that each of the memory devices stores one of the data blocks with the corresponding instance of the local ECC;
generating a global ECC across all of the data blocks or the encoded data blocks;
writing the global ECC to a global ECC storage memory device;
checking for a global ECC error and one or more local ECC errors based on reading the global ECC storage memory device and the memory devices;
based on determining that a global ECC correctable error and a local ECC correctable error are identified, attempting error correction using either a read global ECC or a read local ECC, and verifying that neither the global ECC correctable error nor the local ECC correctable error exist after attempting the error correction;
based on determining that the global ECC correctable error and a local ECC uncorrectable error are identified, attempting error correction using the read global ECC, and verifying that the local ECC uncorrectable error is corrected or correctable after attempting the error correction using the read global ECC; and
based on determining that a global ECC uncorrectable error and the local ECC correctable error are identified, attempting error correction using the read local ECC, and verifying that the global ECC uncorrectable error is corrected or correctable after attempting the error correction using the read local ECC.

14. The computer program product of claim 13, wherein the tangible storage medium further stores instructions for execution by the processing circuit for performing the method comprising:
generating an instance of a local ECC corresponding to the global ECC; and
writing the instance of the local ECC corresponding to the global ECC to the global ECC storage memory device.

15. The computer program product of claim 13, wherein the global ECC comprises a greater number of bits than a number of bits included in any one of the data blocks.

16. The computer program product of claim 13, wherein the tangible storage medium further stores instructions for execution by the processing circuit for performing the method comprising:
inserting a special purpose bit in one of the data blocks prior to generation of the local ECC, each of the data blocks comprising an odd number of bits, and each instance of the local ECC comprising an odd number of bits.

17. The computer program product of claim 16, wherein the special purpose bit comprises a parity bit or an inversion bit.

18. The computer program product of claim 13, wherein the tangible storage medium further stores instructions for execution by the processing circuit for performing the method comprising:
retrying error correction based on determining that the local ECC uncorrectable error transitioned to the local ECC correctable error or the global ECC uncorrectable error transitioned to the global ECC correctable error.

* * * * *